July 26, 1927.
G. M. SCHWIEMAN
1,637,284
STEERING WHEEL
Filed Feb. 11, 1925
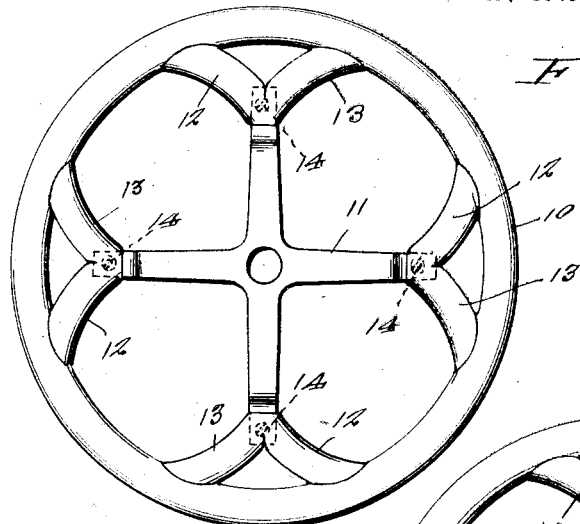
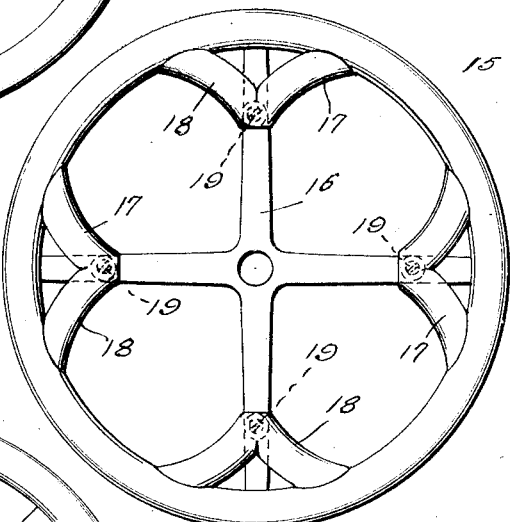
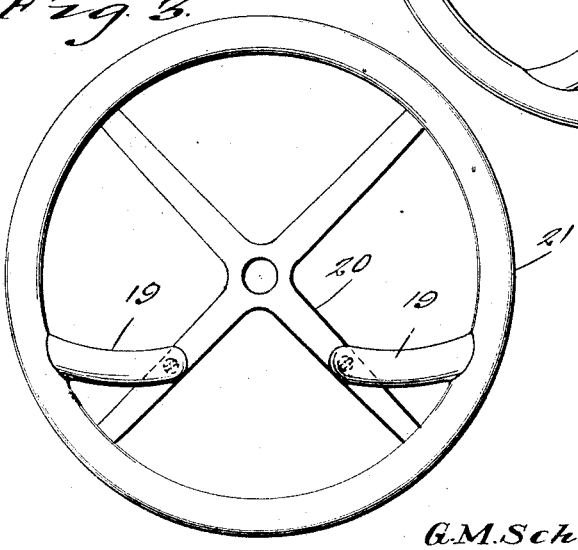
G. M. Schwieman
INVENTOR
BY Victor J. Evans
ATTORNEY Patented July 26, 1927.

1,637,284

UNITED STATES PATENT OFFICE.

GUSTAVE M. SCHWIEMAN, OF DETROIT, MICHIGAN.

STEERING WHEEL.

Application filed February 11, 1925. Serial No. 8,548.

This invention relates to steering wheels, and while its general application is contemplated by the claim, the wheel is primarily intended for use in connection with motor operated vehicles, the invention residing in the provision of a plurality of auxiliary hand holds arranged between the spokes and the inner periphery of the rim of the wheel, so that they can be conveniently grasped instead of the rim in order to rest the arms of the driver, the invention being particularly useful when touring or driving a car great distances.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a plan view of a steering wheel constructed in accordance with one embodiment of the invention.

Figure 2 is a plan view of a modified construction.

Figure 3 is a similar view of another modified construction.

Referring to Figure 1 of the drawing 10 represents the rim of a steering wheel of any well known construction, while 11 represents the spokes. As shown in this form of the invention, the spokes terminate in spaced relation to the rim 10, each spoke being connected with the rim by means of a pair of converging hand holds or rests indicated at 12 and 13 respectively. These hand holds as shown in Figure 1 constitute a unit, and the unit is bolted or otherwise secured to the adjacent end of the spoke 11, where the hand holds are joined together as indicated at 14. In other words, the hand holds or rests 12 and 13 diverge from the ends of the spokes 11 and are so arranged that they can be conveniently grasped instead of the rim 10 of the wheel, to afford the driver a certain degree of rest or comfort, particularly when driving on long trips.

In Figure 2, the rim of the wheel is indicated at 15 and the spokes therefor at 16. The only difference between this form of the invention and that shown in Figure 1, resides in the fact that the spokes 16 are terminally connected with the rim of the wheel in the ordinary well known manner. Consequently, the hand holds or rests 17 and 18 respectively, which constitute a unit, the same as described in Figure 1 are connected with the spoke as at 19, that is, an appreciable distance away from the end of the spoke which is connected with the rim. However, the hand holds or rests 17 and 18 of each pair are arranged substantially in the same manner with relation to the rim 16 as the hand holds or rests 12 and 13 above referred to.

In Figure 3, I have shown another modified form of the invention which is differentiated from the above form in that the hand holds 19 are not made in pairs, but are singly connected with each spoke 20 of the wheel and also with the rim 21 thereof. One or more of these hand holds or rests can be used with the wheel, but two are preferably so used and arranged as illustrated in Figure 3.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A steering wheel of the character described, including a rim, and radially extending spokes within the rim, converging hand holds extending inwardly from the rim and secured to the outer end of the spokes at the point of juncture of said hand holds.

In testimony whereof I affix my signature.

GUSTAVE M. SCHWIEMAN.